July 6, 1965 R. E. FIRST ETAL 3,192,962
METHOD OF MAKING HINGED TWO PIECE WIRE FABRIC
Original Filed March 22, 1961 15 Sheets-Sheet 1
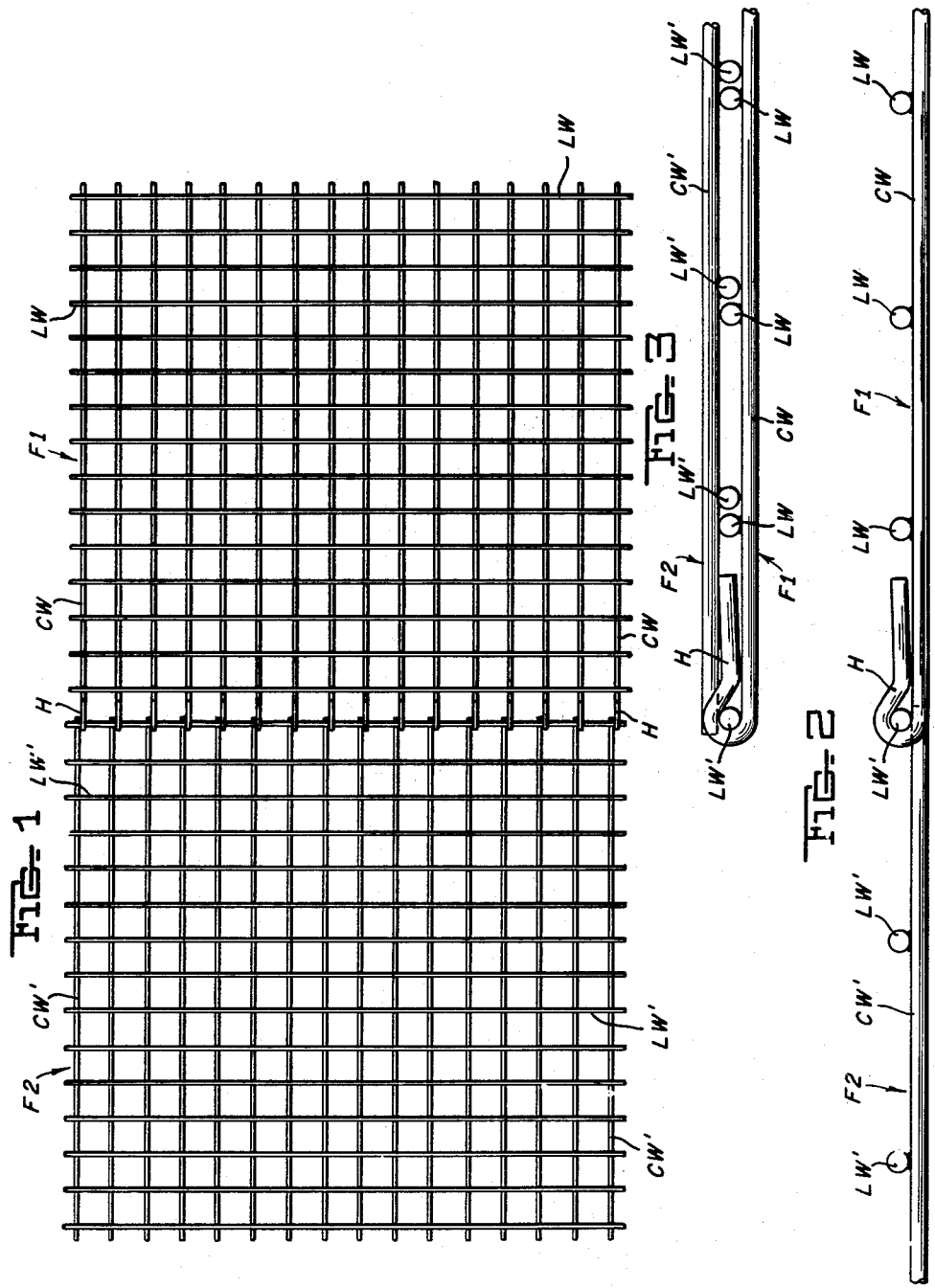
INVENTORS
ROBERT E. FIRST,
ALBERT L. STOECKEL and
WILLIAM H. STOKES
By
Attorney

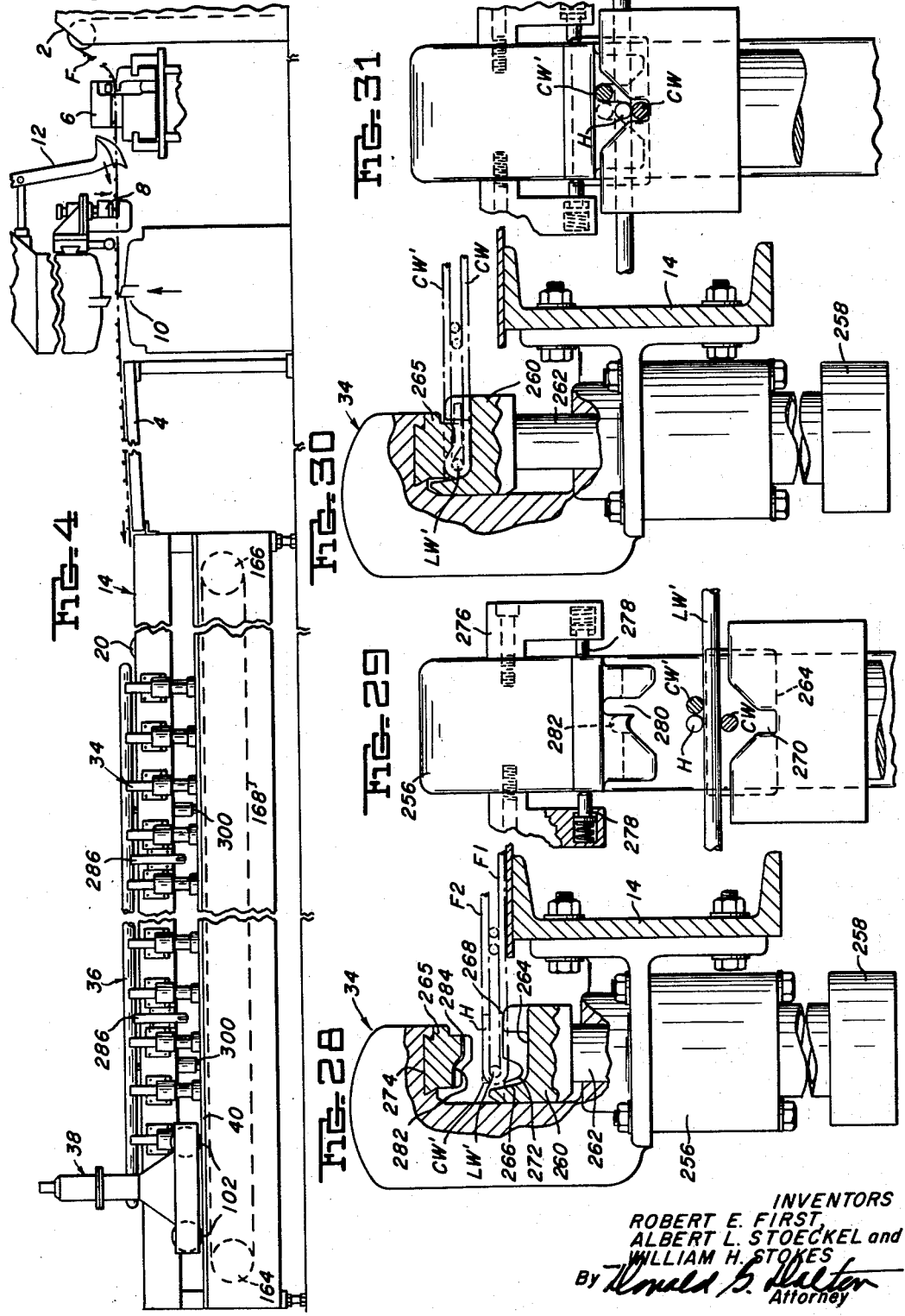

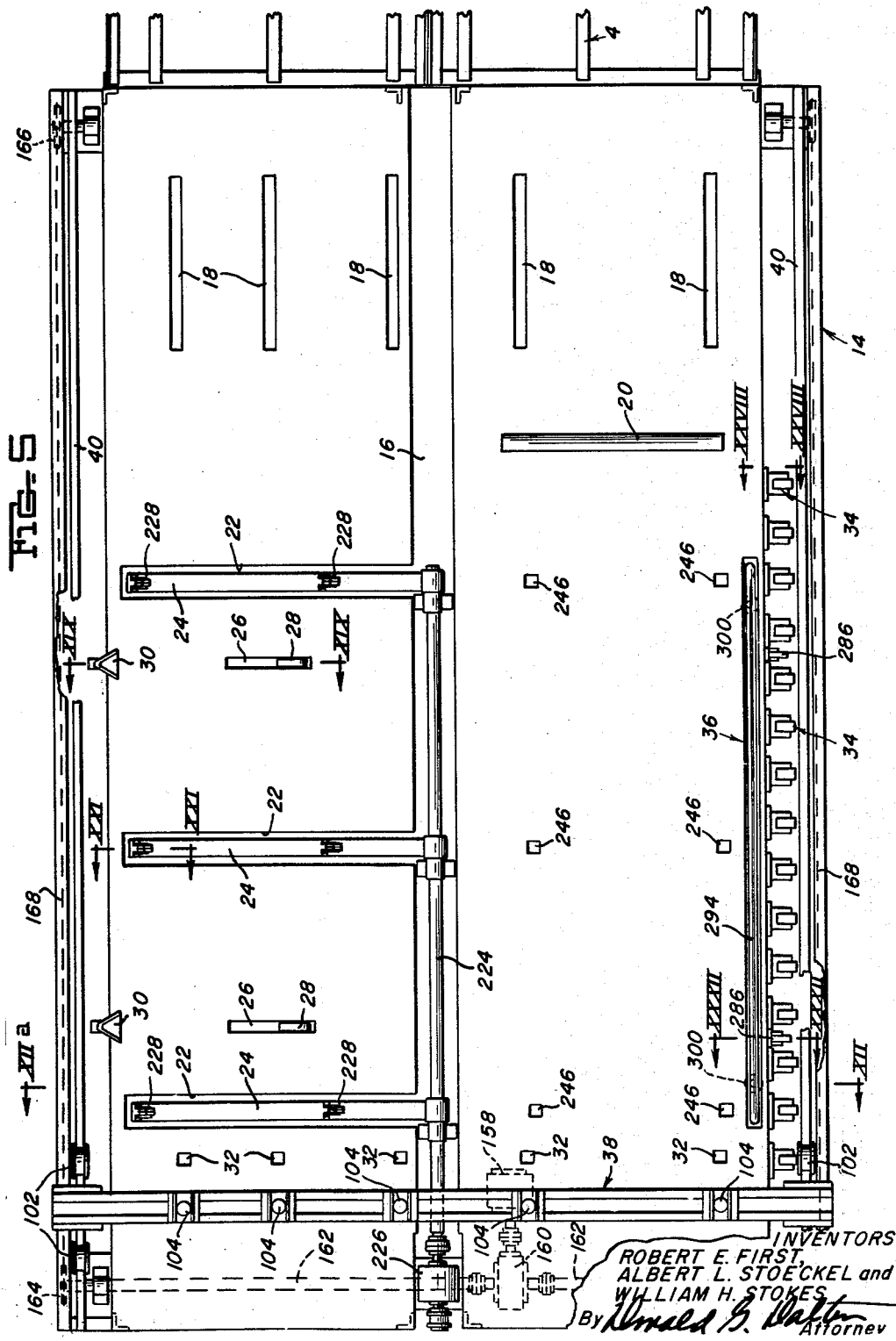

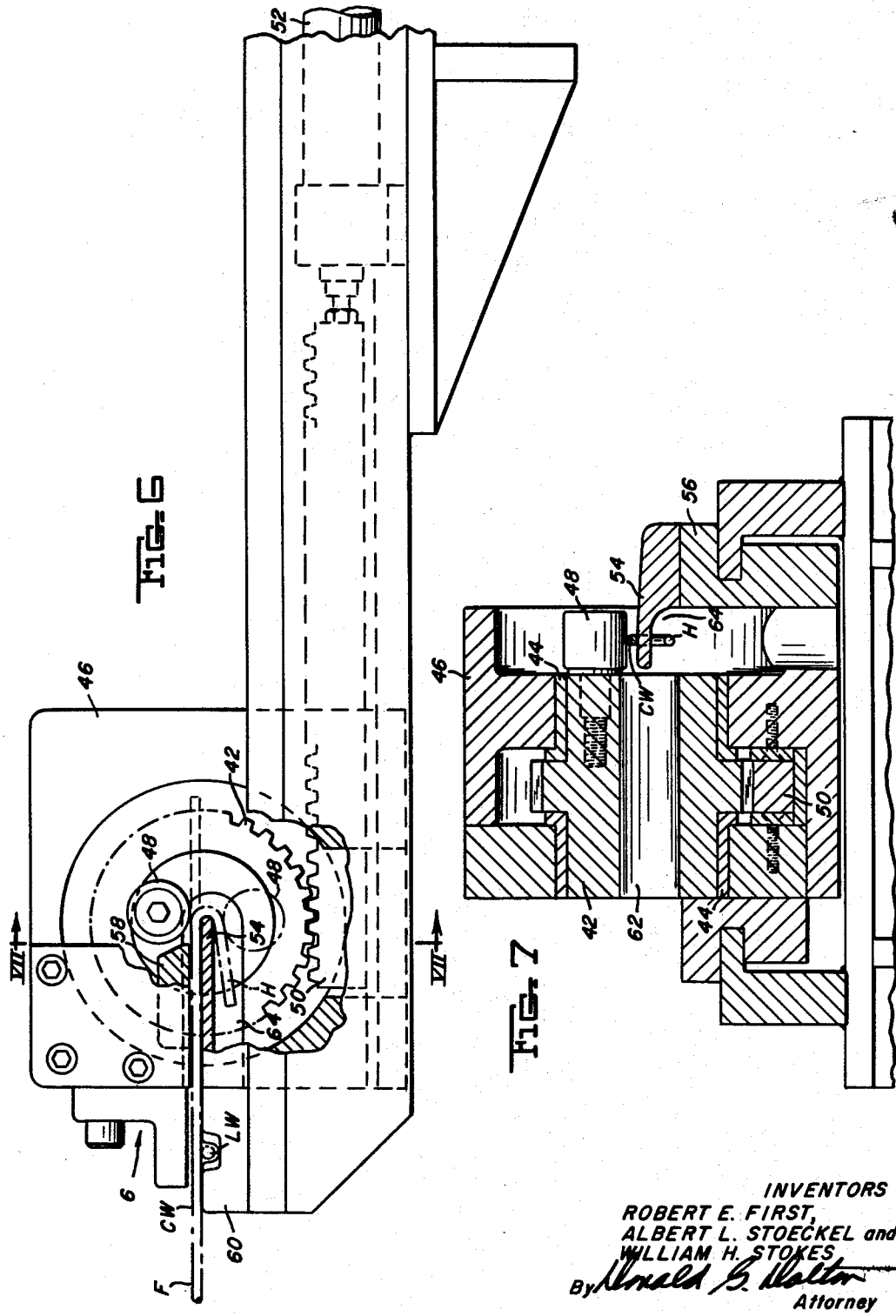

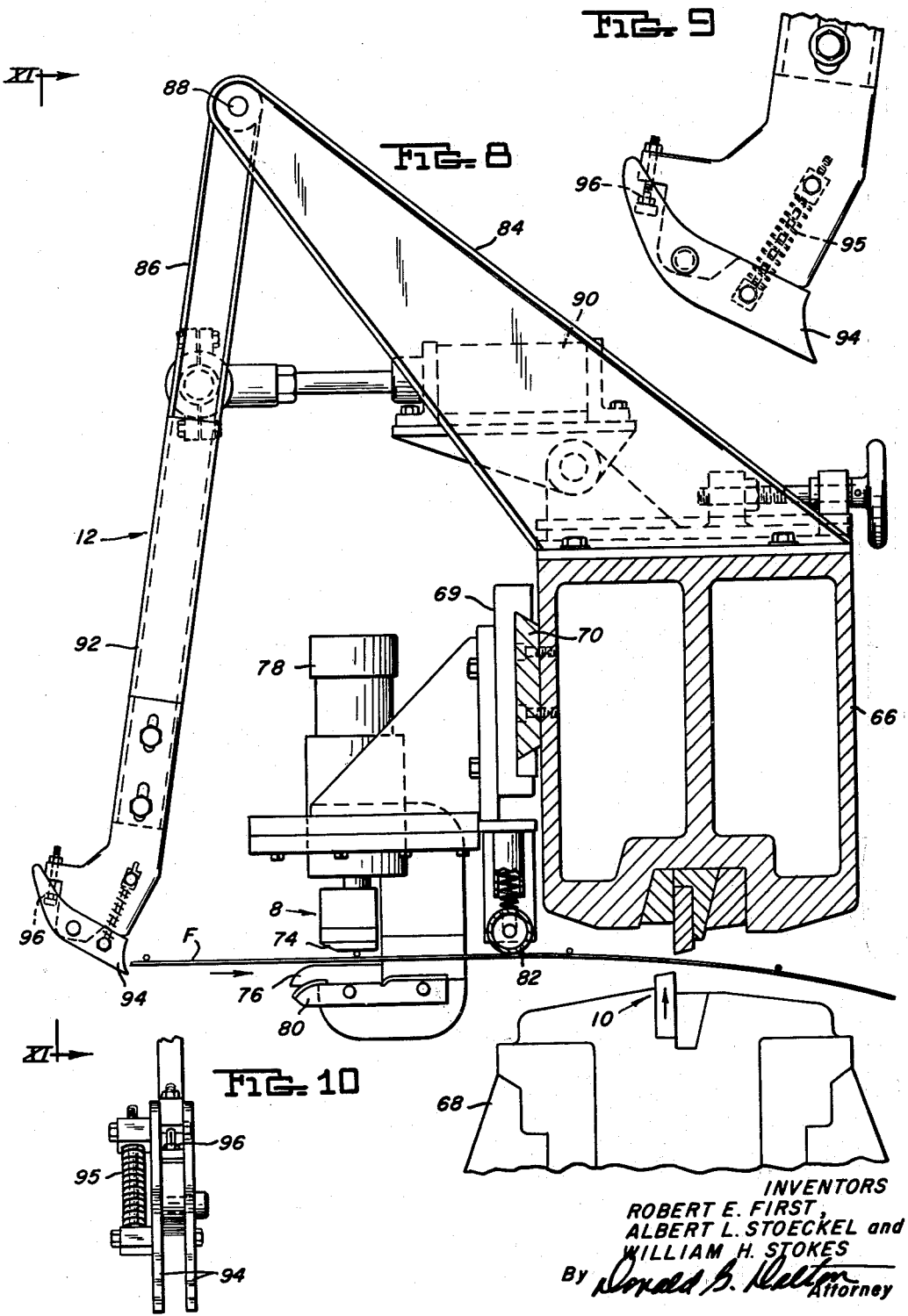

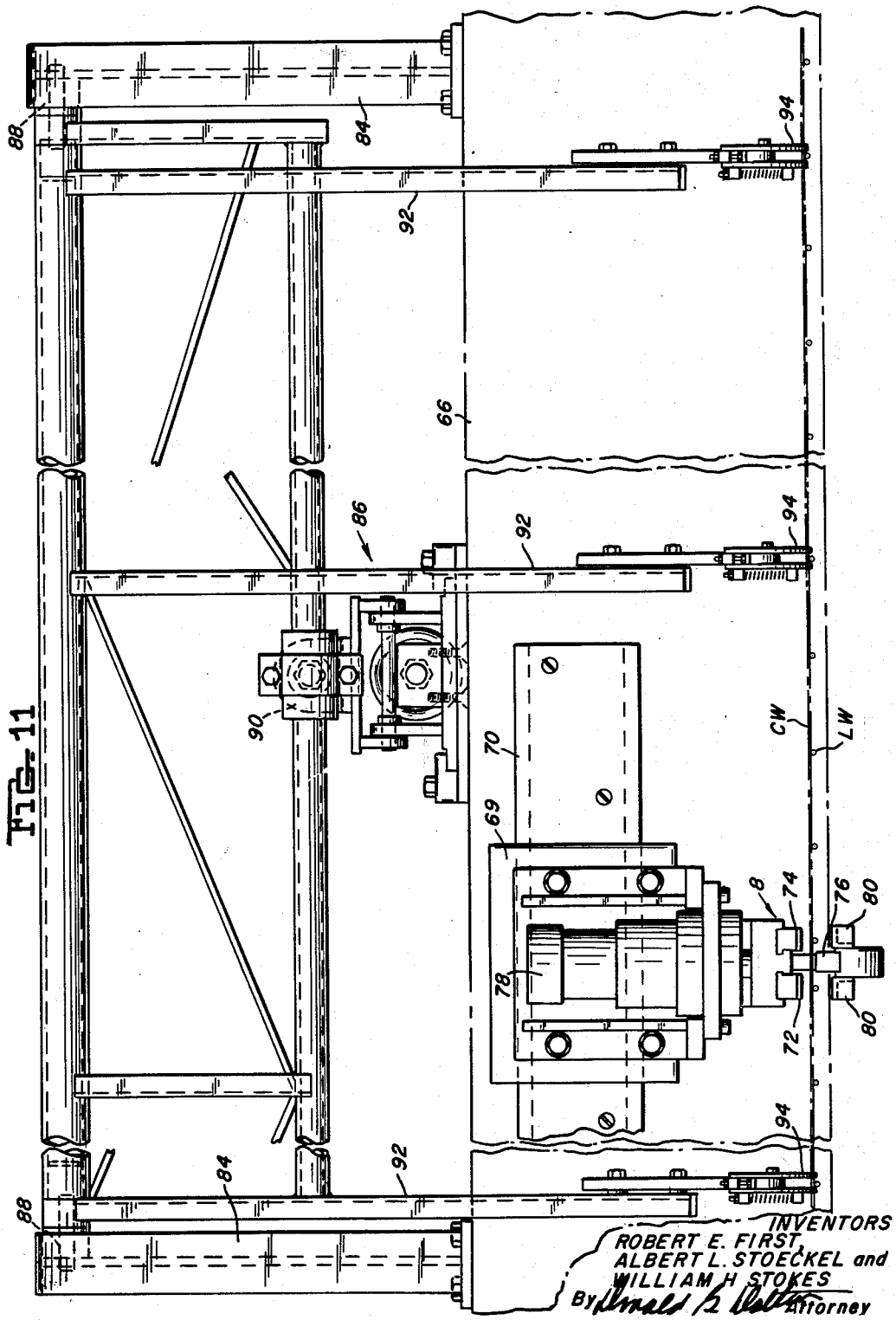

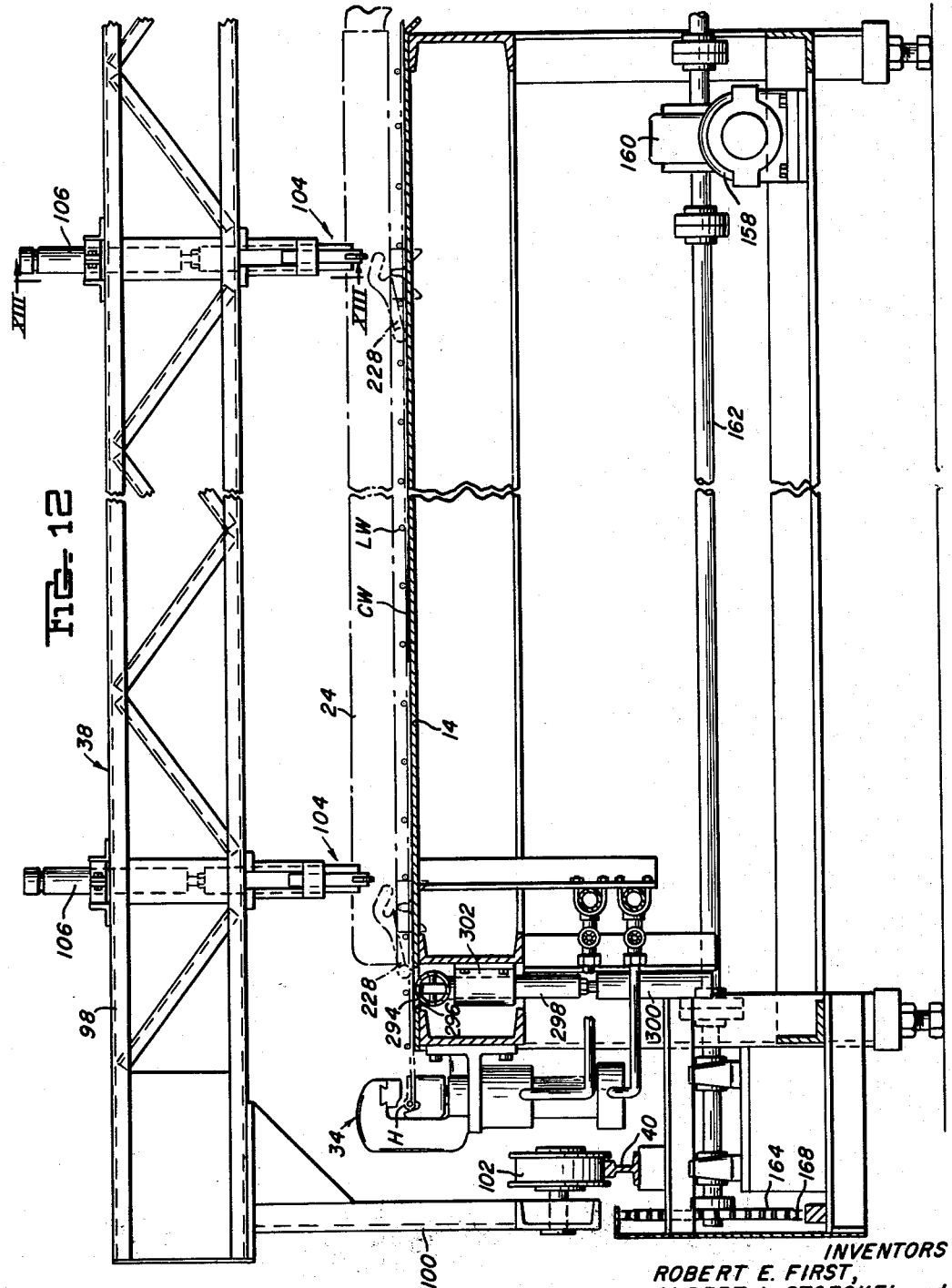

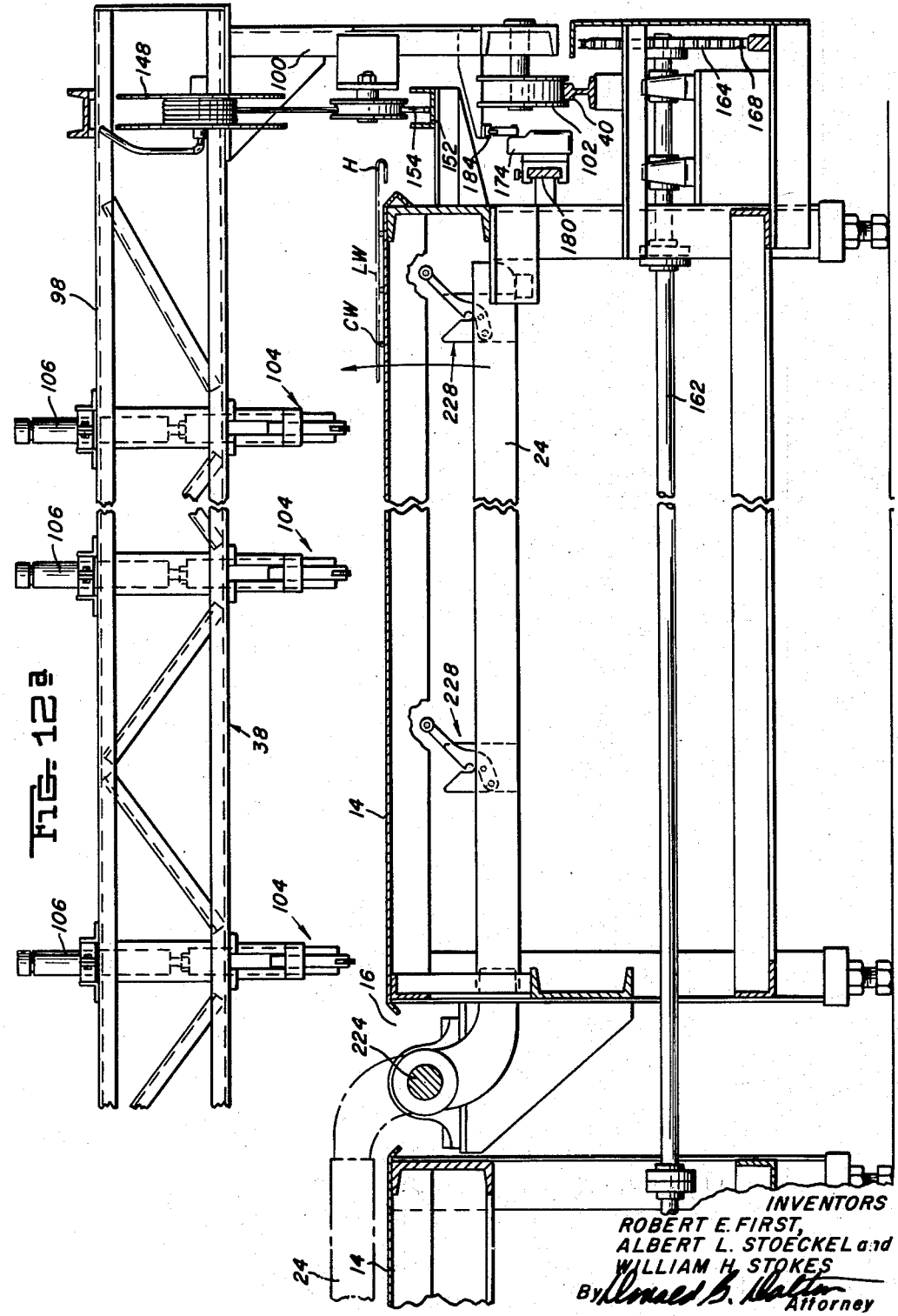

July 6, 1965    R. E. FIRST ETAL    3,192,962
METHOD OF MAKING HINGED TWO PIECE WIRE FABRIC
Original Filed March 22, 1961    15 Sheets-Sheet 9
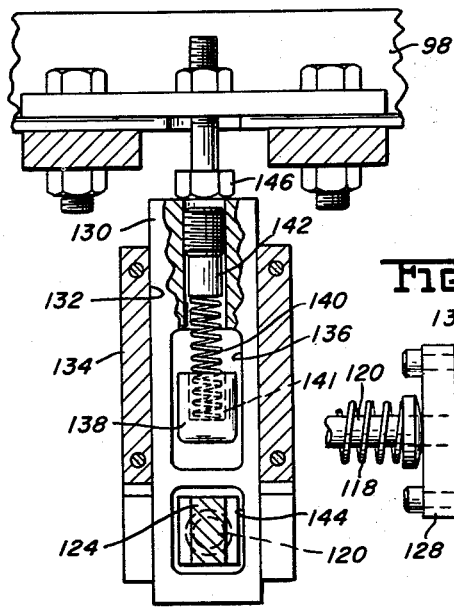
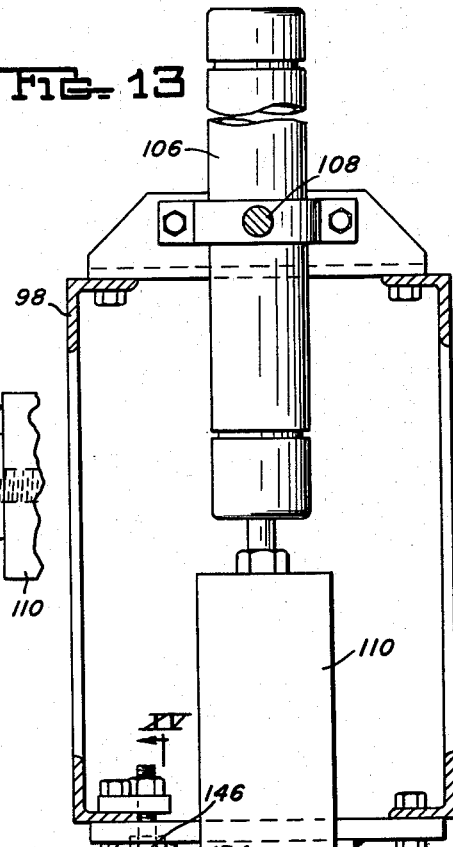
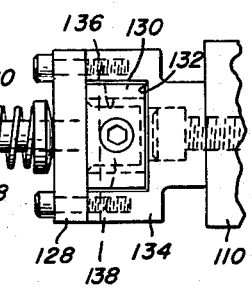
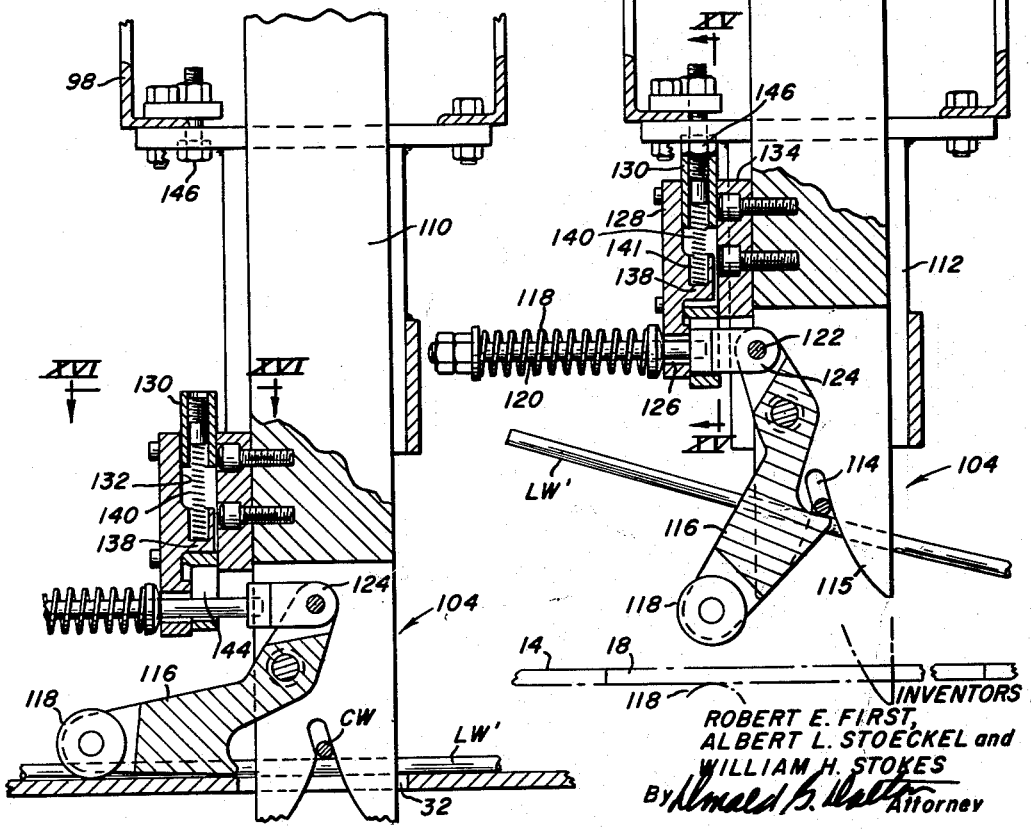
INVENTORS
ROBERT E. FIRST,
ALBERT L. STOECKEL and
WILLIAM H. STOKES
By
Attorney

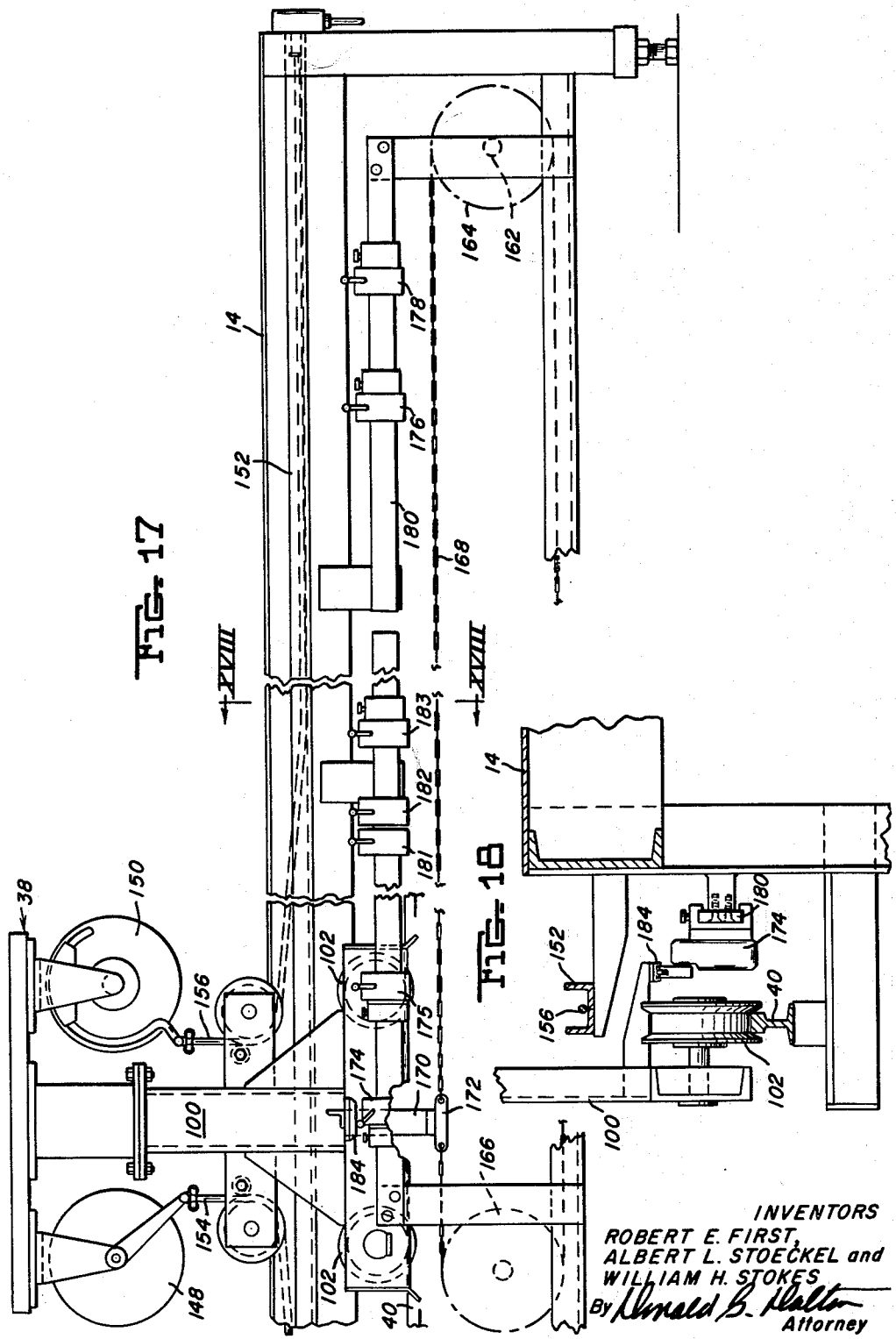

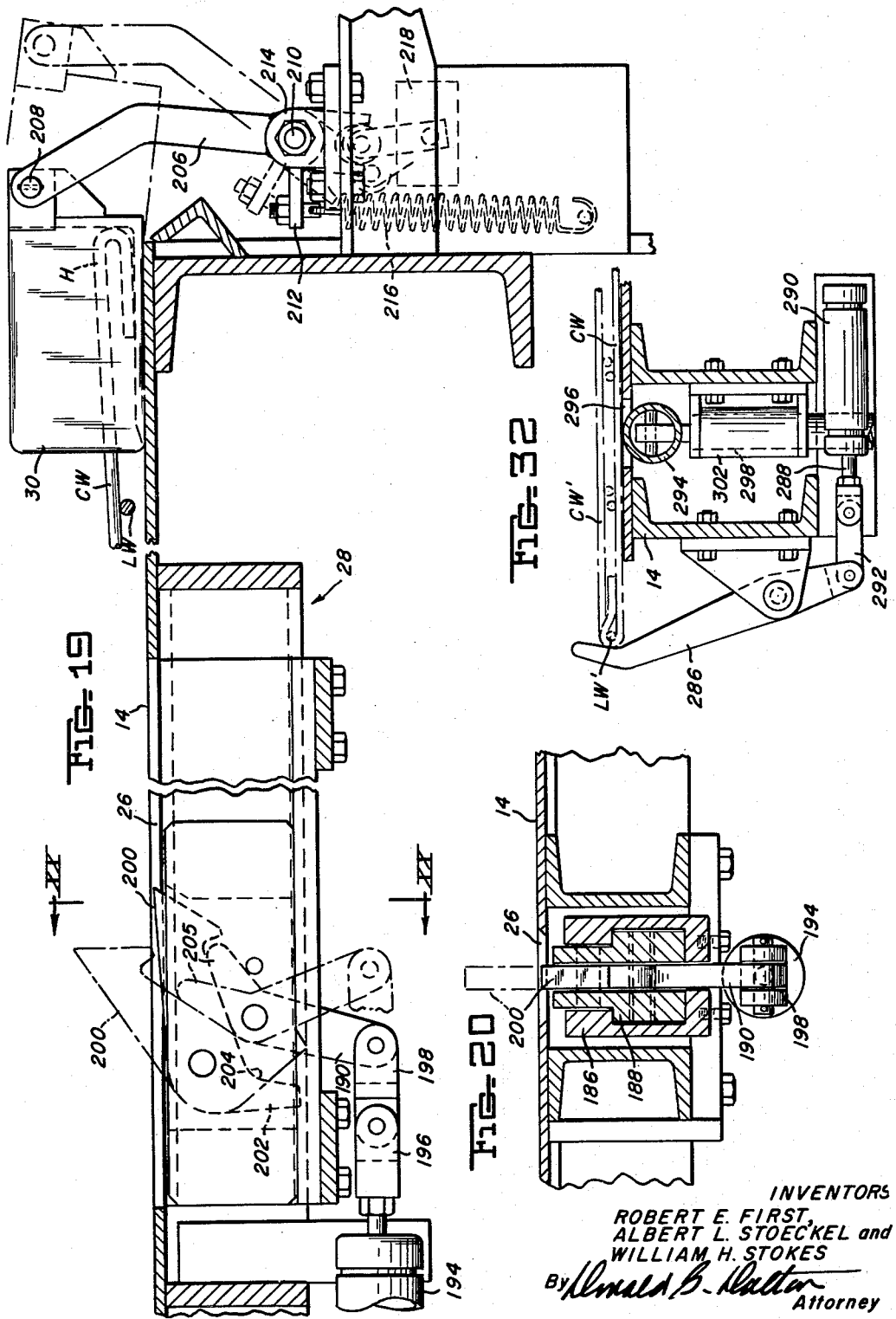

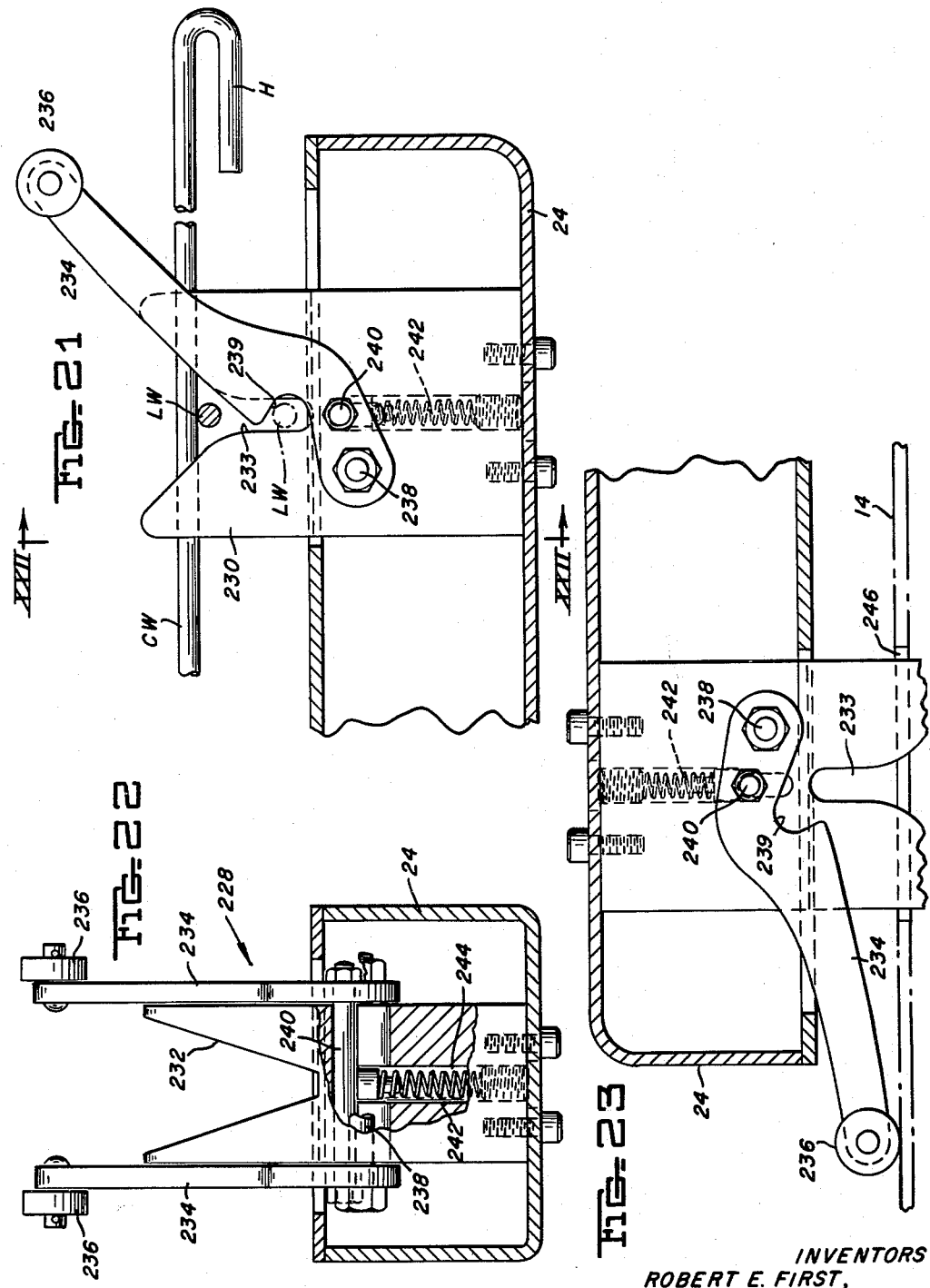

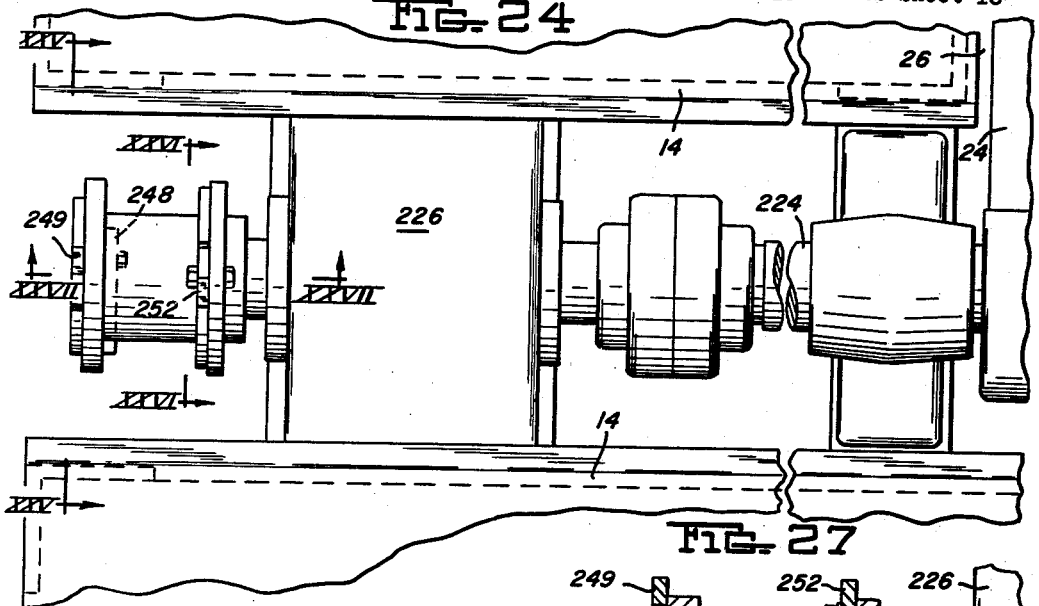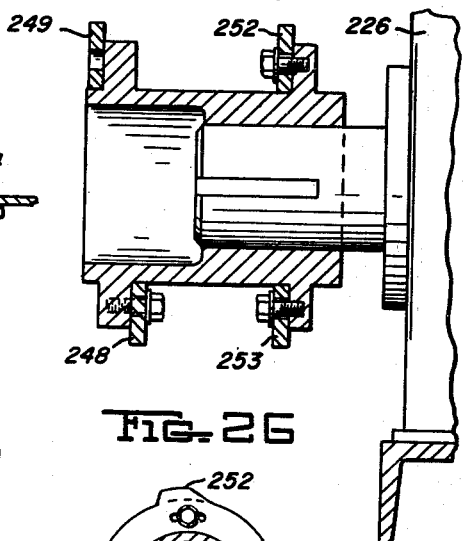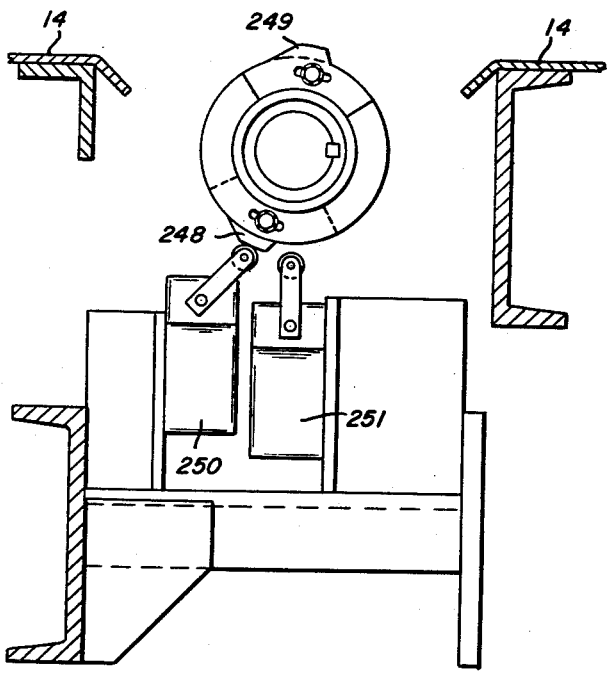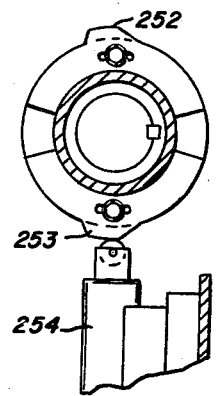

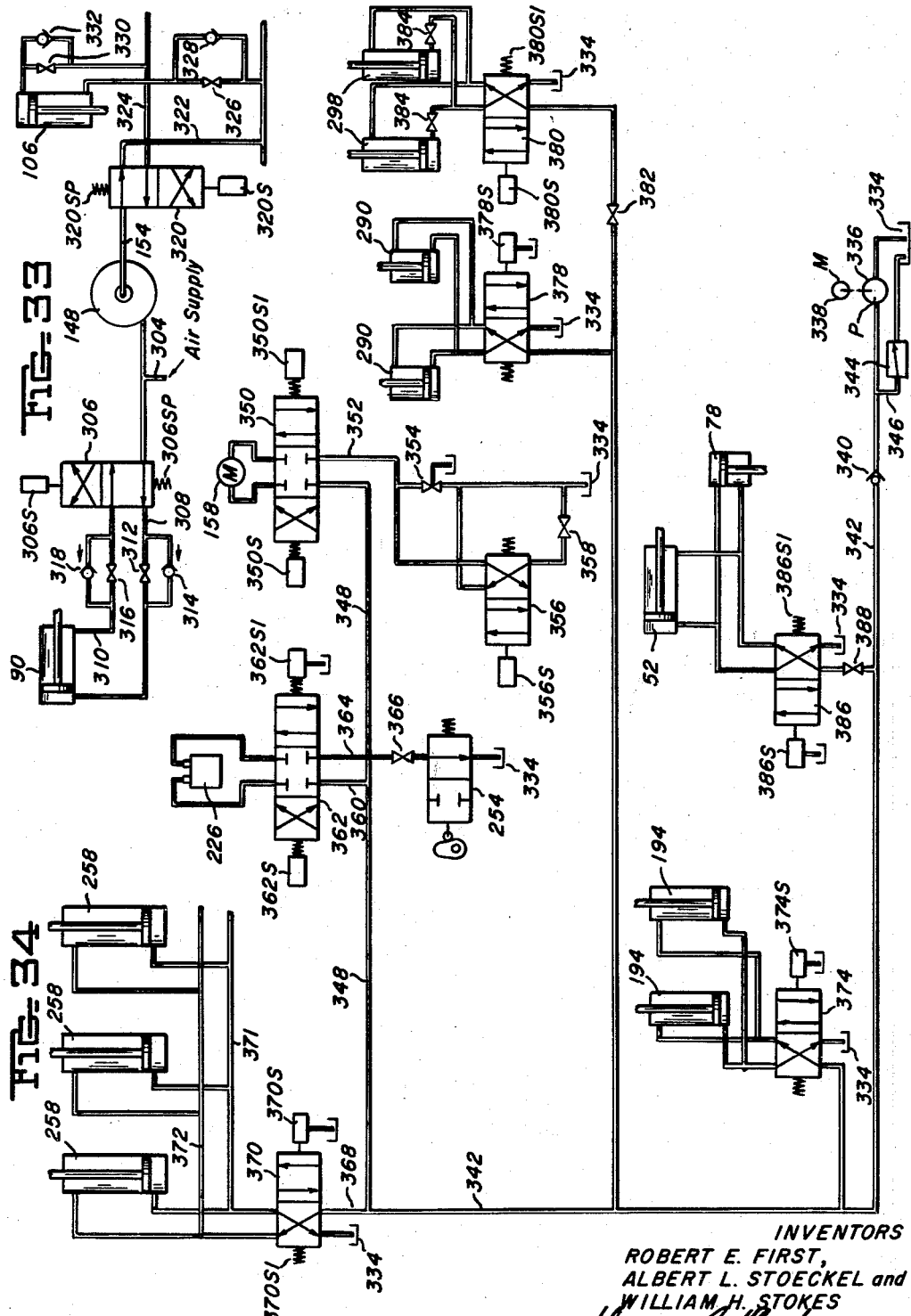

July 6, 1965  R. E. FIRST ETAL  3,192,962
METHOD OF MAKING HINGED TWO PIECE WIRE FABRIC
Original Filed March 22, 1961  15 Sheets-Sheet 15
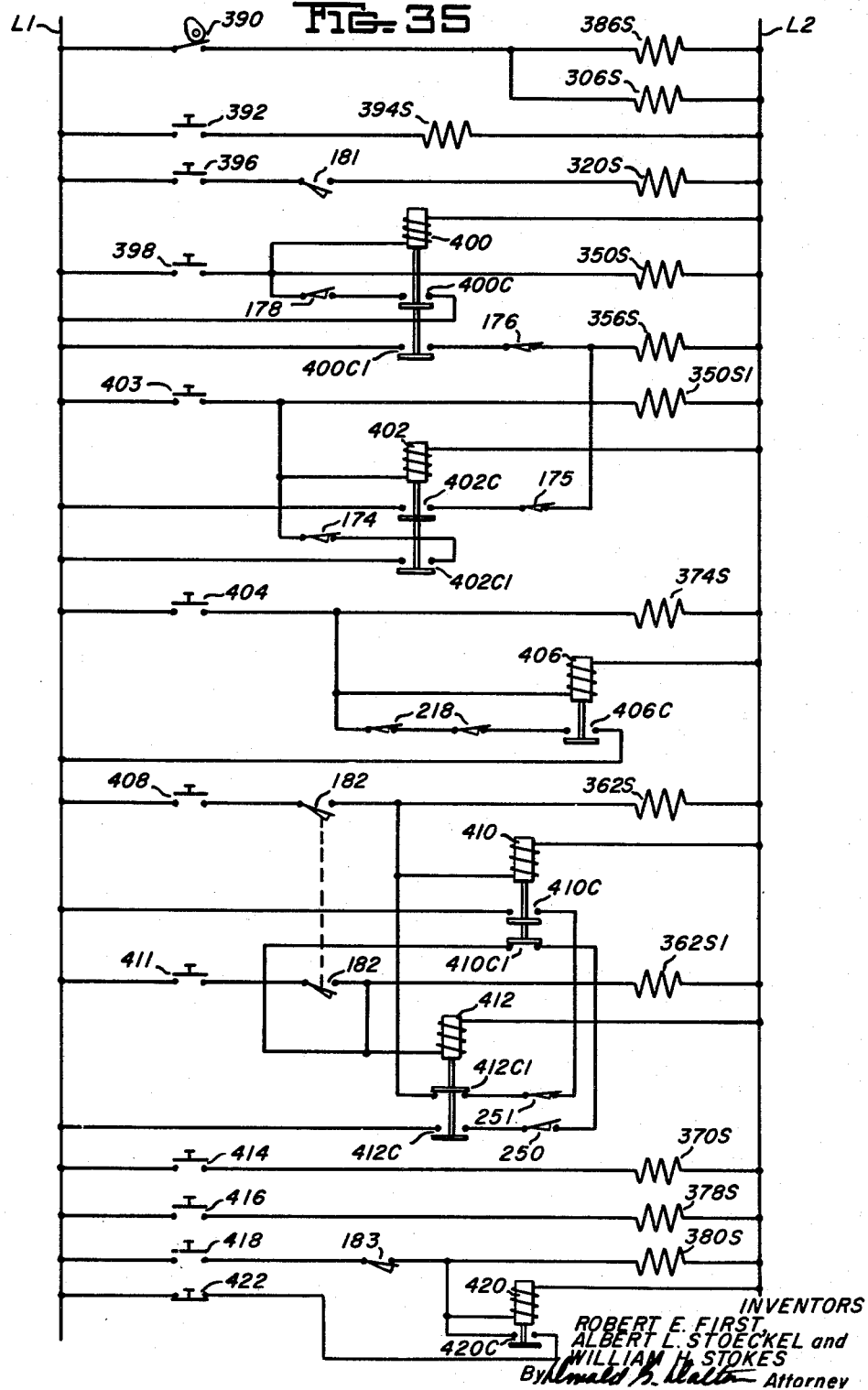
INVENTORS
ROBERT E. FIRST,
ALBERT L. STOECKEL and
WILLIAM H. STOKES
By /s/ Attorney

United States Patent Office 3,192,962
Patented July 6, 1965

3,192,962
METHOD OF MAKING HINGED TWO PIECE WIRE FABRIC

Robert E. First, Willowick, Albert L. Stoeckel, Euclid, and William H. Stokes, Lakewood, Ohio
Original application Mar. 22, 1961, Ser. No. 97,584. Divided and this application Feb. 27, 1964, Ser. No. 347,940
4 Claims. (Cl. 140—107)

This application which is a division of our copending application Serial No. 97,584 filed March 22, 1961, relates to a method of making hinged two piece wire fabric and particularly to such fabric for use as reinforcing mesh in roads and the like. Reinforcing wire fabric is manufactured at a plant and then shipped to the job. In order to do this economically the fabric must be in flat condition. In some instances the fabric is of such width that it cannot be shipped by truck to the road site because of traffic regulations. In order to overcome this drawback it has been proposed to make the fabric in two sections and hinge them together in various ways so that the two pieces of fabric will lie flat. Prior to our invention this was seldom done because of the expense involved in fastening the two sections of fabric together.

It is therefore an object of our invention to provide a method of making hinged two piece wire fabric economically.

This and other objects will be more apparent after referring to the following specification and attached drawings, in which:

FIGURE 1 is a plan view of a hinged fabric made according to the invention;
FIGURE 2 is an enlarged side view of a portion of the fabric of FIGURE 1;
FIGURE 3 is a view, similar to FIGURE 2, but showing the fabric in folded position;
FIGURE 4 is a schematic longitudinal elevation of apparatus used in the practice of our invention;
FIGURE 5 is an enlarged plan view of the left end of the apparatus of FIGURE 4;
FIGURE 6 is an enlarged elevation, with parts broken away, showing a hook former;
FIGURE 7 is a view taken on the line VII—VII of FIGURE 6;
FIGURE 8 is an enlarged longitudinal elevation of the fabric feed mechanism;
FIGURE 9 is an enlarged view of a portion of FIGURE 8;
FIGURE 10 is a view looking toward the left of FIGURE 9;
FIGURE 11 is a view taken on the line XI—XI of FIGURE 8;
FIGURES 12 and 12a are a combined view taken on the line XII—XIIa of FIGURE 5;
FIGURE 13 is an enlarged view taken on the line XIII—XIII of FIGURE 12;
FIGURE 14 is a view, similar to the lower portion of FIGURE 13, showing the parts in a different position;
FIGURE 15 is a view taken on the line XV—XV of FIGURE 13;
FIGURE 16 is a view taken on the line XVI—XVI of FIGURE 14;
FIGURE 17 is an elevation to an enlarged scale looking toward the top of FIGURE 5;
FIGURE 18 is a view taken on the line XVIII—XVIII of FIGURE 17;
FIGURE 19 is an enlarged view taken on the line XVIIII—XVIIII of FIGURE 5;
FIGURE 20 is a view taken on the line XX—XX of FIGURE 19;
FIGURE 21 is an enlarged view taken on the line XXI—XXI of FIGURE 5;
FIGURE 22 is a view taken on the line XXII—XXII of FIGURE 21;
FIGURE 23 is a view, similar to FIGURE 21, but showing parts thereof in a different position;
FIGURE 24 is a plan view on an enlarged scale of a portion of the left end of FIGURE 5;
FIGURE 25 is a view taken on the line XXV—XXV of FIGURE 24;
FIGURE 26 is a view taken on the line XXVI—XXVI of FIGURE 24;
FIGURE 27 is a view taken on the line XXVII—XXVII of FIGURE 24;
FIGURE 28 is a view to an enlarged scale with parts broken away taken on the line XXVIII—XXVIII of FIGURE 5;
FIGURE 29 is a view on an enlarged scale looking toward the right to FIGURE 28;
FIGURE 30 is a view, similar to FIGURE 28, but showing the parts in a different position;
FIGURE 31 is a view to an enlarged scale looking toward the right of FIGURE 30;
FIGURE 32 is an enlarged view taken on the line XXXII—XXXII of FIGURE 5;
FIGURE 33 is a schematic view of the pneumatic system;
FIGURE 34 is a schematic view of the hydraulic system; and
FIGURE 35 is a schematic view of the electrical controls.

Referring more particularly to FIGURES 4 and 5 of the drawings, reference numeral 2 indicates a conventional welded wire fabric machine in which spaced longitudinal wires passing through the machine are welded to spaced cross wires at the intersections thereof. A support 4, preferably made of pipe, is located on the exit side of the fabric machine 2 and the formed fabric passes thereto from the machine 2. A hinge former 6 is located along the right hand side of the path of travel of the fabric F between the machine 2 and support 4 and a fabric parting shear 8 is located just on the exit side of the hinge former 6 at a point essentially at the longitudinal center of the fabric F so as to divide the fabric into sections F1 and F2. A shear 10 is arranged on the exit side of shear 8 for shearing the fabric to length. Feed mechanism 12 is located adjacent the shear 10 so as to feed the fabric F longitudinally over the support 4. A fabric support table 14 is located adjacent the exit end of support 4, the top thereof being substantially horizontal. The table 14 is separated into two sections by means of a longitudinal opening 16. A plurality of longitudinal slots 18 are provided in the table 14 for a purpose which will appear later. A raised plate 20 is provided on top of the left side of table 14 adjacent the slots 18. Three transverse openings 22 are provided in the top of table 14 on the right hand side thereof for receiving flipper arms 24. A transverse slot 26 is provided between each pair of openings 22 for receiving fabric shifting mechanism 28. In line with each of the slots 26 on the right hand edge of the table 14 is a slidable V-shaped member 30 for receiving and positioning the hooked ends of the cross wires CW of the fabric F1. Square openings 32 are provided in table 14 at the exit end thereof in longitudinal alignment with the slots 18. Arranged on the left hand edge of table 14 are a plurality of hinge closers 34. Fabric pushing and lifting mechanism 36 is provided adjacent the hinge closers 34. A carriage or transfer bridge 38 extends transversely of table 14 and is mounted for longitudinal movement on rails 40 extending along each edge of table 14.

As shown in FIGURES 1 and 3 the hinged fabric consists of two pieces F1 and F2. Piece F1 consists of longitudinal wires LW welded to cross wires CW and piece F2 consists of longitudinal wires LW' welded to cross wires CW'. One edge longitudinal wire LW' is received in hooks H formed at one end of each cross wire CW.

As shown in FIGURES 6 and 7 the hook forming mechanism 6 includes a gear 42 mounted for rotation in bearings 44 supported by housing 46. A roller 48 is mounted for movement with gear 42 and is also rotatable about its own axis which is parallel to the axis of gear 42 which in turn is parallel to the direction of movement of the fabric F. A rack 50 is slidably mounted in housing 46 for movement transverse to the direction of movement of the fabric F. The rack 50 is in mesh with gear 42 and is connected to the piston rod of a hydraulic motor 52. A forming die 54 is attached to slide member 56. A back-up block 58 is mounted on housing 46 above forming die 54. A line wire guide 60 is mounted on the housing 46 for receiving the longitudinal wire LW. In forming an open hook on the end of a cross wire CW the index movement of the fabric brings the cross wire CW with its end beneath the full line position of forming roller 48 and above the forming die 54 as shown in FIGURE 6. The hydraulic motor 52 then operates to move the rack 54 forwardly, thus rotating gear 42 and carrying with it roller 48 to the broken line position shown in FIGURE 6 so as to bend the wire CW around the forming die 54 and form an open hook H. The hydraulic motor 52 is then operated to return the roller 48 to its original position where it is ready to receive another cross wire CW. Upon indexing, the cross wire CW with the hook H formed thereon is advanced through an opening 62 in gear 42 and a slot 64 in housing 46.

As shown in FIGURES 8 to 11, an upper beam 66 and a lower support 68 extend transversely to the path of travel of the fabric F on the exit side of the hook former 6 and support the conventional up cut shear 10 through which the fabric passes. Parting shear 8 is attached to the beam 66 adjacent the center thereof by means of a bracket 69 which is slidably mounted on a dove tail plate 70 secured to the beam 66. The bracket 69 can be moved transversely on dove tail plate 70 to adjust for different widths of fabric to be slit. Upper shearing dies 72 and 74 cooperate with a lower shearing die 76 to cut a 1 inch section out of the cross wire. A hydraulic motor 78 mounted on bracket 69 reciprocates the upper shearing dies 72 and 74. Guide plates 80 attached to the lower end of the shear frame support the fabric after the cut has been completed. Spring pressed rollers 82, only one of which is shown in FIGURE 8, are mounted on the beam 66 in spaced transverse relationship above the path of travel of the fabric between shears 8 and 10 and holds down the fabric after the cut is made by shear 10. Fabric feed mechanism 12 is supported by brackets 84 attached to the top of beam 66. The feed mechanism 12 includes a frame 86 which is pivotally mounted in bearings 88 supported at the top of brackets 84. Frame 86 is reciprocated about its bearings 88 by means of a pivotally mounted air motor 90. Three spaced arms 92 extend downwardly from frame 86 with each of the arms having a pivotally mounted fabric positioning finger 94 at its lower end to feed the fabric. A spring 95 urges the finger 94 downwardly in a clockwise direction as shown in FIGURES 8 and 9 against a stop 96. The motor 90 operates to move the frame 86 and arms 92 in a counter clockwise direction as shown in FIGURE 8 so that the fingers 94 engage a cross wire and feed the fabric forwardly into the shear 8. Air is then introduced into the opposite end of cylinder 90 to move the frame 86 in a clockwise direction back to the original position shown with the springs 95 being compressed to enable the fingers 94 to ride over the cross wires of the fabric.

The carriage 38 as shown in FIGURES 12 to 18 includes a box-like girder 98 scanning table 14 and supported by vertical frames 100 at each end. Two wheels 102 mounted on the bottom of each frame 100 are supported on the rails 40. Mounted on the beam 98 are five fabric lifting mechanisms 104. Each of the mechanisms 104 includes an air cylinder 106 which is pivotally supported on the girder 98 by means of a trunnion 108. A ram 110 is connected to the piston rod associated with cylinder 106 and extends downwardly through a guide 112 attached to the lower end of the girder 98. The lower end of the ram 110 is forked to provide a slanting wire slot 114. It will be noted that the slot 114 has a funnel shaped entry 115 which permits the cross wires of the fabric to be guided into position on the downward thrust of the ram. A latching lever or finger 116 having a wheel 118 at its lower end is pivotally mounted on the ram 110 about an axis extending transversely of the path of movement of the fabric. The latch finger 116 is urged toward closed position by means of a spring 118 surrounding a bolt 120 which is attached to the upper end of finger 116 by means of a pin 122. The bolt 120 has a rectangular portion 124 at the end adjacent pin 122. The bolt 120 extends through a hole 126 in a cover plate 128 against which one end of the spring 118 bears. A latch 130 is slidably mounted in a groove 132 in a latch bracket 134 attached to the ram 110. The latch 130 has an opening 136 therein for receiving a lug 138 forming part of or attached to cover plate 128. A spring 140 extends between an opening 141 in lug 138 and a shoulder 142 provided in the latch 130. Thus the latch 130 is urged upwardly by means of spring 140. An opening 144 is provided in the latch 130 and is of such size as to receive the rectangular portion 124 of bolt 120. An adjustable bolt or stop 146 is mounted on the bottom of truss or girder 98. To pick up the welded wire fabric sections carriage 38 is positioned above the slots 18 and pressure is applied to the top of cylinder 106 to move the ram 110 downwardly into the associated table slot 18 as shown in FIGURE 13 in broken lines. The resistance of the fabric cross wire as it enters the slot 114 forces the latch lever 116 open against the bias of spring 118 so as to snap the wire into holding position. The fabric is then raised by supplying air to the bottom of cylinder 106 after which the carriage is moved to a forward position over square holes 32. When the rams 110 are lowered the rollers 118 contact the top of the table 14 so as to rotate the finger 116 into open position against the bias of spring 118 as shown in FIGURE 14. This permits the spring 140 to move the latch 130 upwardly so that the edge of the opening 144 will be behind the end of the square portion 124 of the bolt 120, thus preventing the latch finger 116 from closing. The ram 110 is then raised until the latch 130 hits the bottom of bolt 146 which moves the latch downwardly about 1/8 of an inch, thus releasing the bolt 120 and returning the latch finger 116 to closed position. The wire slot 114 is angled at 15° to the vertical to provide a safety release for the fabric during the time it is being transported by the carriage 38. An automatic reel 148 is provided on one side of the carriage 38 to pay out and take up the rubber air hose used to supply air to the lifting cylinders 106. A second reel 150 mounted adjacent reel 148 supplies a multiple wire electric cable to the control elements located on the carriage 38. A trough 152 is attached to the side of the table 14 and supports air hose 154 and cable 156. A hydraulic motor 158 is mounted beneath the end of the table 14 remote from the fabric machine 2. The motor 158 drives a worm gear reducer 160 which in turn drives shaft 162 having sprockets 164 at the end thereof. Idler sprockets 166 are arranged at the opposite end of table 14 one in alignment with each of the sprockets 164. A chain 168 passes around each pair of sprockets 164 and 166 and is connected to the associated frame 100 by means of a connecting block 170 and chain connecting link 172. The limits of travel and stopping position of the carriage 38 are controlled by limit switches 174, 175, 176 and 178 which are adjustably mounted on slide bar 180 supported on the side of table 14. Interlock switches 181, 182 and 183 are also mounted on slide bar 180. A cam 184 mounted on the carriage 38 actuates the switches 174, 175, 176, 178, 181, 182 and 183.

Each of the fabric shifting mechanisms 28 shown in FIGURES 19 and 20 includes a guide 186 mounted beneath slot 26 for slidably supporting a slide 188. A two armed lever 190 is pivotally mounted on the slide 188. A hydraulic cylinder 194 is mounted beneath the table 14 with its axis transverse to the table and with its piston rod connected to the lower arm of lever 190 through a clevis 196 and connecting link 198. A fabric shifting dog 200 is also pivotally mounted on the slide 188 with its pivot point above the pivot point of lever 190. The dog 200 has a downwardly extending arm 202 which forms a V 204 at its intersection with the upper part of the dog. When fluid is delivered to the left end of cylinder 194 as shown in FIGURE 19 the lever 190 is rotated in a counter clockwise direction from its full line position to its broken line position with its upper arm 205 raising dog 200 to its broken line position above the top of table 14 where the lever 190 is locked in the V 204 after 1¼" of travel. Continued movement of the piston of cylinder 194 causes the slide 188 to move toward the right side of table 14, thus engaging a longitudinal view LW of fabric F1 and moving the fabric outwardly until it enters the associated V-shaped fabric guide 30 which is slidably mounted. A lever 206 is pivotally mounted on a pin 208 supported by guide 30. The other end of lever 206 is pivotally mounted on a pin 210 supported on the side of table 14. An arm 212 attached to a hub 214 which carries lever 206 is attached to one end of a spring 216, the other end of spring 216 being attached to the table 14. Movement of the guide 30 to the right as shown in FIGURE 19 will cause lever 206 to actuate a switch 218 to stop the shift cycle. The spring 216 returns the fabric guide 30 to initial position after the fabric is flipped over.

Each of the flipper arms 24 is connected to a longitudinal shaft 224 in the opening 26 which is oscillated by a hydraulic motor 226. Two automatic latching finger assemblies 228 are arranged on each arm 24 in spaced apart relationship. As best shown in FIGURES 21 to 23 each of the assemblies 228 includes a latch block 230 having V-shaped slots 232 and 233 therein for receiving the fabric F1. A pair of levers or latch arms 234, each having a roller 236 at its free end, are pivotally mounted on arm 24 by means of a pin 238. Each of the levers 234 has a notch 239 therein for receiving a longitudinal wire LW to prevent upward movement thereof in slot 233. A pin 240 extends between the arms 234 of each unit in spaced relationship with the pin 238 and a spring 242 arranged in a spring pocket 244 urges the arms 234 in a counter clockwise direction as shown in FIGURE 21. As the arms 24 rotate upwardly a longitudinal wire LW of the fabric F1 is received in each slot 233 with the arms 224 being momentarily forced open against the bias of springs 244 by the weight of the fabric after which the spring 244 biases the arms 234 upwardly to lock the longitudinal wires LW in the bottom of slots 233. Clearance for the cross wire CW is provided by the slots 232. The continued rotation of arms 24 carries the piece of fabric upwardly and reverses it to position it on the left side of the table 14 with the open ends of the hooks H upwardly. As shown in FIGURE 23 the rollers 236 contact the surface of the table 14 causing the latch arms 234 to open and the fabric to drop out of the slots 233 onto the table. Clearance holes 246 are provided in the top of the table to permit the projecting ends of the latch block 230 to enter. Cams 248 and 249 mounted on shaft 224 as shown in FIGURES 24, 25 and 27 operate switches 250 and 251 to control the operation of motor 226. Also mounted on shaft 224 are cams 252 and 253 which control the operation of valve 254. The purpose of valve 254 is to gradually slow down motor 226.

As shown in FIGURES 28 to 31 each of the hinge closing assemblies 34 includes a bracket or housing 256 fastened to table 14. A hydraulic cylinder 258 is attached to the lower end of the bracket 256 with its axis vertical. A lower die 260 is attached to piston rod 262 associated with cylinder 258. The die 260 has a central recess 264 therein for supporting hook portion H during the closing operation and providing clearance for upper closing die 265. A vertical tapered surface 266 at the back of die 260 helps guide the end of the hook into location for the closing operation. The die 260 also has a raised section 268 across its front with a chamfered slot 270 therein which provides clearance for the hook H and at the same time the sloping surface of the chamfer prevents the upper end of the hook from slipping out of alignment with the cross wire. Notches 272 are provided in die 260 to provide clearance for longitudinal wire LW'. The upper closing die 265 is slidably received in the top of bracket 256 in a dove tail slide 274 which extends in a longitudinal direction. A spring holder bracket 276 is screwed into each side of the bracket 256 and contains a spring 278 which centers the die 265, but also allows it to shift approximately 3/16 of an inch in either direction to self align it with the hook H on the cross wire CW since there may be a slight variation in the center to center spacing of the cross wires. The upper die 265 has a vertical off-set slot 280 thereon adjacent a central slot 282.

In assembling fabric pieces F1 and F2 piece F2 is on top of piece F1 with cross wires CW' of piece F2 close to and parallel to the top end of hook H and with the cross wires CW directly beneath the top part of hook H as shown in FIGURES 28 and 29. The lower die 260 is then raised with wire CW' being received in slot 280 and wire CW being received in slot 270. The top die 265 engages the top of hook H on the surface 284 of slot 282, thus forcing the hook downwardly into engagement with the lower portion thereof and surrounding longitudinal wire LW' as shown in FIGURES 30 and 31. The lower die 260 is then lowered permitting the fabric pieces F1 and F2 to fall out of the upper die 265.

As best shown in FIGURES 12 and 32 the fabric pushing and lifting mechanism 36 includes two spaced apart levers 286 pivotally mounted on table 14 with the upper part thereof extending above the table and lower part extending downwardly where it is attached to a piston rod 288 of a hydraulic cylinder 290 by means of a pivotal link 292. Movement of the piston rod 288 to the left as shown in FIGURE 32 causes the levers 286 to move the assembled fabric out of the closing dies. A lifting bar 294 extends longitudinally of table 14 in a recess 296 and is connected to piston rods 298 associated with spaced cylinders 300. The upper part of the piston rod 298 is received in a guide 302. Upward movement of the lifting bar 294 raises the completed fabric above the top of brackets 256 so that it can be easily removed from the table 14 by workmen.

As shown in FIGURE 33 air for controlling the operation of air motor 90 is supplied from a conduit 304 through a four way valve 306 and conduits 308 and 310 connected to opposite ends of the cylinder 90. A speed control valve 312 having a restricted opening is connected in conduit 308 in parallel with a check valve 314 which permits full flow of air in the direction of the arrow while preventing flow of air from the opposite direction. In like manner a speed control valve 316 and a check valve 318 are connected in parallel in conduit 310. When solenoid 306S of valve 306 is energized the valve 306 will be in the position shown so that there is full flow of air through conduit 308 to the rear end of cylinder 90 and restricted flow from the forward end through the conduit 310 to exhaust. When the solenoid 306S is deenergized spring 306SP will move valve 306 to connect conduit 304 to conduit 310 and conduit 308 to exhaust so that there will be full flow of air to the forward end of cylinder 90 and restricted flow from the rear end thereof. Air for operating hydraulic motor 106 passes from conduit 304 through the hose 154 on reel 148 and four-way solenoid operated valve 320. For the purpose of simplicity only one motor 106 is shown, but the connection between the valve 320 and each motor 106 will be the same as that shown. Conduits 322 and 324 lead from the valve 320 to opposite ends of cylinder 106. Speed control valve 326 and check valve 328 are connected in parallel in conduit 322 and similarly control valve 330 and check valve 332 are connected in parallel in conduit 324. The operation of this control is the same as that for motor 90.

As shown in FIGURE 34, oil for the hydraulic system is provided from a tank 334 by means of a pump 336 driven by motor 338. A check valve 340 is arranged in conduit 342 leading from pump 336. A pressure relief valve 344 is arranged in a return line 346 connected to conduit 342 on the pump side of check valve 340. A branch conduit 348 leads to the hydraulic carriage transfer motor 158 through a four-way double acting solenoid valve 350. A conduit 352 leads from motor 158 through valve 350 to tank 334 through parallel paths, one including control valve 354, another including solenoid operated valve 356, a third including solenoid valve 356 in a different position and control valve 358. A supply conduit 360 leads to flipper arm motor 226 through double solenoid operated valve 362. A conduit 364 leads from motor 226 through valve 362 to reservoir 334 through a flow control valve 366 and cam operated valve 254.

Branch conduit 368 leads from conduit 342 through a solenoid operated valve 370. Conduits 371 lead from valve 370 to the bottom of hinge closing cylinders 258, only three of which are shown, the others being connected in parallel therewith. Conduits 372 lead from the top of cylinders 258 to the valve 370.

A solenoid operated valve 374 controls flow of fluid to and from hook sheet shifter cylinders 194. A solenoid operated valve 378 controls flow of fluid to and from hinged sheet shifter cylinders 290. A solenoid operated valve 380 controls flow of fluid to and from fabric raise cylinders 298. Flow control valve 382 is arranged on the entry side of valve 380 and a pair of valves 384 are arranged one in each of the lines leading to the bottom of cylinders 298. Control of fluid to hook forming cylinder 52 and parting shear cylinder 78 is controlled by means of a solenoid operated valve 386. A flow control valve 388 is arranged on the entry side of valve 386.

In the simplified electrical control circuit shown in FIGURES 35 a 110 volt 60 cycle power source L1, L2 supplies current to the various controls. A switch 390 which is preferably a cam switch driven by the welding fabric machine 2 controls flow of current through valve solenoids 306S and 386S. Energization of solenoid 306S causes valve 306 to move to the position shown in FIGURE 33 so as to deliver air through conduit 308 to the rear end of cylinder 90, thus causing feed mechanism 12 to retract. Deenergization of solenoid 306S permits a spring 306SP to move the valve 306 from the position shown so as to deliver air under full pressure to the front of cylinder 90 to feed the fabric F one step. Energization of solenoid 386S moves valve 386 from the position shown in FIGURE 34 so as to deliver air to the rear of cylinders 52 and 78, thus causing the hook forming mechanism to form a hook H and the parting shear 8 to cut a piece from the cross wire of the fabric at the center portion thereof. Deenergization of solenoid 386S permits spring 386S1 to return the valve 386 to the position shown, thus returning the pistons of cylinders 52 and 78 to their original position. The shear 10 is operated in a conventional manner by means of a push button switch 392 which when closed energizes solenoid 394S which controls a valve, not shown, for operating the shear mechanism. Solenoid 320S is connected in series with interlock switch 181 and a push button switch 396. If the carriage is in fabric pick up position at the entry end of table 14, interlock switch 181 will be closed and when push button switch 396 is closed solenoid valve 320S will be energized. Energization of solenoid 320S will cause valve 320 to move from the position shown in FIGURE 33, thus introducing air at full pressure through conduit 324 to the top of cylinders 106, thus forcing the associated rams 110 downwardly to grasp the fabric. Release of push button switch 396 deenergizes solenoid 320S, thus permitting spring 320SP to return the valve 320 to the position shown so that high pressure air passes through conduit 322 to the bottom of cylinders 106 in order to raise the fabric from the table 14. Solenoid 350S is connected in series with a push button switch 398 and in parallel with a relay coil 400 having normally open contacts 400C and 400C1. Contact 400C and limit switch 178 are connected in series with push button switch 398. Contact 400C1 and limit switch 176 are connected in series with solenoid 356S. A relay coil 402 having normally open contacts 402C and 402C1 is connected in series with a push button switch 403 and in parallel with solenoid 350S1. Contact 402C and limit switch 175 are connected in parallel with contact 400C1 and limit switch 176. Limit switch 174 and contact 402C1 are connected in parallel with switch 403. When it is desired to feed the carriage 38 forwardly from the pick up position, push button switch 398 is closed. This energizes solenoid 350S and relay coil 400. Energization of coil 400 closes its contact 400C to lock it and solenoid 350S in. Closing of contact 400C1 energizes solenoid 356S. Energization of coil 350S causes fluid under pressure to be delivered to motor 158 in such a direction as to cause motor 158 to move carriage 38 forwardly. Energization of solenoid 356S causes the valve 356 to be positioned so that fluid can return to reservoir 334 through valve 356 without substantial restriction. Thus the carriage 38 can travel rapidly until its cam 38C opens switch 176. Opening of switch 176 deenergizes solenoid 356S so as to position valve 356 to cause flow of fluid from motor 158 at a reduced rate through valve 354, thus slowing down the motor 158. The carriage 38 continues moving at reduced speed until its cam 38C opens switch 178. Opening of switch 178 deenergizes solenoid 350S and relay coil 400 since push button switch 398 is only momentarily closed. This will cause motor 158 to stop. When it is desired to return the carriage to its original position push button switch 403 is momentarily closed, thus energizing solenoid 350S1 and relay coil 402. Energization of relay coil 402 closes its contacts 402C and 402C1. Closing of contact 402C energizes solenoid 356S to position valve 356 for rapid rotation of motor 158. Energization of solenoid 350S1 positions valve 350 to cause motor 158 to rotate in the reverse direction. Closing of contact 402C1 locks solenoid 350S1 and coil 402 in so that they will remain energized when momentarily closed switch 403 opens. When carriage cam 38C opens switch 175 solenoid 356S will be deenergized, thus causing slow down of motor 158. The carriage 38 continues moving at reduced speed until its cam 38C opens switch 174. Opening of switch 174 deenergizes solenoid 350S1 and relay coil 402, thus causing motor 158 to stop.

Push button switch 404 is connected in series with solenoid 374S which in turn is connected in parallel with relay coil 406 having a normally open contact 406C. Contact 406C and limit switches 218 are connected in parallel with push button switch 404. Momentary closing of switch 404 energizes solenoid 374S and relay coil 406. Energization of relay coil 406 closes contact 406C to lock solenoid 374S and coil 406 in which push button switch 404 is open. Energization of solenoid 374S causes operation of valve 374 so as to cause flow of fluid to the rear of cylinders 194 and move the fabric F1 forward into guide 30. Movement of guide 30 will open limit switches 218 to deenergize solenoid 374S and relay coil 406, thus positioning valve 374 to deliver fluid into the forward end of cylinders 194 and return them to their original position.

Push button switch 408 is connected in series with one contact of limit switch 182 and with solenoid 362S. Relay coil 410 having normally open contact 410C and normally closed contact 410C1 is connected in parallel with solenoid 362S. A push button switch 411 is connected in series with the other contact of limit switch 182 and with solenoid 362S1. A relay coil 412 having normally open contact 412C and normally closed contact 412C1 is connected in parallel with solenoid 362S1. Contacts 410C and 412C1 and limit switch 251 are connected in parallel with the first mentioned contact of limit switch 182 and with push button switch 408. In order to move the hook section of fabric from the right side of table 14 to the left side push button switch 408 is closed and, if the carriage 38 is in the pickup position, switch 182 will be closed so that solenoid 362S and coil 410 will be energized. Energization of coil 410 closes contact 410C to lock solenoid 362S and relay 410 in. Opening of contact 410C1 prevents accidental energization of solenoid 362S1. Energization of solenoid 362S causes flow of fluid to motor 226 in such a direction as to rotate flipper arm 24 from the right side of table 14 to the left side thereof. As the flipper arm 24 approaches the end of its travel cam operated valve 254 will gradually close to slow down the motor 226 and when the arm reaches the end of its travel switch 251 will be open, thus deenergizing solenoid 362S and coil 410. When it is desired to return the flipper arms 24 to their original position, push button switch 411 is momentarily closed and if the carriage 38 is at the entry end of table 14 switch 182 will also be closed so that solenoid 362S1 and coil 412 will be energized. Energization of solenoid 362S1 will position valve 362 to operate the motor 226 in the opposite direction and return the flipper arms 24 to their original position. Energization of relay coil 412 will open its contact 412C1 to prevent accidental energization of solenoid 362S by momentary depression of switch 408. Contact 412C will be closed to lock solenoid 362S1 and coil 412 in. As the arms 24 approach the table openings 22, cam operated valve 254 will gradually close to slow down the motor 226 and when the flipper arms 24 reach the end of their travel limit switch 250 will be opened to stop operation of motor 226.

A push button switch 414 is connected in series with solenoid 370S and in order to operate the hinge closing mechanism switch 414 will be closed to energize solenoid 370S. This will position valve 370 to deliver fluid to the bottom of the cylinders 258. When push button switch 414 is open solenoid 370S will be deenergized so that spring 370S1 will return the switch to the original position so as to deliver fluid into the top of cylinders 258.

A push button switch 416 is connected in series with solenoid 378S so that when switch 416 is closed solenoid 378S will be energized. This will position valve 378 to deliver fluid into the rear end of cylinders 290 and move the hinged fabric out of the closing dies. Upon release of switch 416 solenoid 378S will be deenergized, thus shifting valve 378 to its original position to deliver fluid to the forward end of cylinders 290. A push button switch 418 is connected in series with limit switch 183 and solenoid 380S. Relay coil 420 is connected in parallel with solenoid 380S. Relay coil 420 has a normally open contact 420C which is connected in series with a push button switch 422 and in parallel with switches 183 and 418. When it is desired to raise the finished fabric above the closing mechanism, push button switch 418 is closed, thus energizing solenoid 380S and relay coil 420. Energization of coil 420 closes its contact 420C to lock solenoid 380S and coil 420 in. Energization of solenoid 380S positions valve 380 to deliver fluid into the bottom of cylinders 298, thus moving them upwardly. If the carriage is in its pickup position limit switch 183 will be closed, but if not switch 183 will be open to prevent raising of the fabric. To lower the fabric, switch 422 is opened, thus deenergizing solenoid 380S and relay 420. Deenergization of solenoid 380S causes spring 380S1 to return valve 380 to its original position to deliver fluid into the top of cylinders 298 and return the fabric lifter to its lower position.

In operation, assuming that a piece of fabric F1 is on the left side of table 14 with its cross wire CW resting on the table 14, fabric F will be formed on the welded fabric machine 2 in the usual manner and will be moving toward the table 14. At a predetermined time when a cross wire is in position in the hinge former 6 the switch 390 will close, thus energizing solenoids 306S and 386S. Energization of solenoid 386S will cause operation of hydraulic motors 52 and 78 to form hook H on the end of the cross wire and to cause the parting shear 8 to cut a piece out of the center of a cross wire. Energization of solenoid 306S will cause operation of air motor 90 to retract feed mechanism 12. Switch 390 then opens to return hydraulic motors 52 and 78 to their original positions and to operate motor 90 to feed the farbic one step forward. The above operations are repeated until the desired length of fabric is on the exit side of shear 10. When this occurs, switch 392 is closed so that shear 10 will operate to cut all the longitudinal wires, thus forming two sheets of fabric F1 and F2. In this position the forward end of fabric sheet F1 will be over slots 18 on the right of table 14 and sheet F2 over slots 18 on the left of table 14. The carriage 38 is positioned over the fabric sheets and the switch 396 closed to energize solenoid 320S so as to move the rams 110 downwardly and grasp the fabric sheets F1 and F2. The switch 396 is then opened so that the rams 110 will pick up the sheets F1 and F2. The switch 398 is then momentarily closed to start the carriage 38 moving toward the other end of table 14. The plate 20 insures that the fabric sheet F2 will not contact the sheet F1 therebeneath during its travel. The carriage 38 stops with the rams 110 over openings 32 when the switch 396 is closed to move the rams 110 downwardly and release the sheets F1 and F2. The switch 396 is then opened so that the rams will move upwardly. Momentary closing of switch 403 will cause carriage 38 to return to its original position. Sheet F1 with sheet F2 thereon are then positioned in the hinge closers 34 and switch 414 closed to cause motors 258 to close the hooks H around edge longitudinal wire LW'. Opening of switch 414 lowers the die 260 after which switch 416 is momentarily closed to actuate levers 286 to move the assembled fabric out of the closing dies. Switch 418 is then momentarily closed to cause lifting bar 294 to raise the hinged side of the assembled fabric above the top of brackets 256 so that it can be easily removed from the table 14. While the foregoing is taking place the operation of machine 2, hook former 6, shear 8 and feeding mechanism 12 will continue until sufficient fabric is made to form two more sheets F1 and F2 by operation of shear 10. Also switch 404 will be momentarily closed so as to cause fabric shifters 28 to move sheet F1 to the desired position to be picked up and flipped over to the left side of table 14. After the completed two piece fabric has been removed from table 14 switch 408 is momentarily closed thus causing flipper arms 24 to pick up sheet F1 and flip it over to the left side of table 14. Push button switch 412 is then momentarily closed to return flipper arms 24 to their original position. Switch 396 is then momentarily closed to move rams 110 downwardly to grasp fabric pieces F1 and F2 and the cycle is repeated as set forth above. It will be understood that interconnecting circuits may be provided to carry out the above steps automatically, but such are omitted for the purpose of simplicity.

While one embodiment of our invention has been shown and described it will be apparent that other adaptations and modifications may be made without departing from the scope of the following claims.

We claim:

1. The method of making hinged two piece fabric having longitudinal wires connected by cross wires which comprises providing two pieces of fabric of approximately the same size having the desired length and width, the first of said pieces having an open hook on each of the cross wires along one outer edge thereof, positioning one of said pieces on top of the other piece with one edge longitudinal wire of the second piece in the hooks of the first piece, then clamping the hooks around said edge longitudinal wire.

2. The method of making hinged two piece fabric having longitudinal wires connected by cross wires which comprises providing two pieces of fabric of approximately the same size having the desired length and width, the first of said pieces having an open hook on each of the cross wires along one outer edge thereof, positioning said two pieces side by side with the hooks of said first piece remote from said second piece, moving said pieces longitudinally with the first piece being placed on top of a hook piece which has been turned upside down, the first named piece being positioned alongside the last named hooked piece, positioning one edge longitudinal wire of the unhooked piece into the hooks of the piece therebeneath, then clamping the hooks around said edge longitudinal wire.

3. The method of making hinged two piece fabric having longitudinal wires connected by cross wires which comprises providing two pieces of farbic of approximately the same size having the desired length and width, the first of said pieces having an open hook on each of the cross wires along one outer edge thereof, positioning said two pieces side by side with the hooks of said first piece remote from said second piece, moving said pieces longitudinally with the first piece being placed on top of a hooked piece which has been turned upside down, the first named piece being positioned alongside the last named hooked piece, positioning one edge longitudinal wire of the unhooked piece into the hooks of the piece therebeneath, then clamping the hooks around said edge longitudinal wire, removing the two piece fabric so formed, and then flipping the first hooked piece over about its unhooked longitudinal edge, and then repeating the operations to form a second hinged two piece fabric.

4. The method of making hinged two piece fabric having longitudinal wires connected by cross wires which comprises providing a section of fabric having the desired length and a width approximately equal to the total width of the two pieces, separating the cross wires essentially in the longitudinal center of said section, forming an open hook on each of the cross wires along one outer edge of one of said pieces, moving said pieces longitudinally with the piece without hooks thereon being placed on top of a hooked piece which has been turned upside down, the first named hooked piece being positioned alongside the second named hooked piece, positioning the edge longitudinal wire of the unhooked piece into the hooks of the piece therebeneath, then clamping the hooks around said edge longitudinal wire, removing the two piece fabric so formed, then flipping the first named hooked piece over about its unhooked longitudinal edge, and then repeating the operations to form a second hinged fabric.

References Cited by the Examiner

UNITED STATES PATENTS 2,300,718  11/42  Williams et al. _____ 140—3

CHARLES W. LANHAM, *Primary Examiner.*

MICHAEL V. BRINDISI, *Examiner.*